Nov. 5, 1940.   G. F. W. POWELL   2,220,544
WEIGHING MECHANISM
Filed Sept. 7, 1939   3 Sheets-Sheet 1

Patented Nov. 5, 1940

2,220,544

UNITED STATES PATENT OFFICE 2,220,544

WEIGHING MECHANISM

Gordon Francis Wellington Powell, Deptford, London, England, assignor to Molins Machine Company, Limited, London, England Application September 7, 1939, Serial No. 293,862
In Great Britain September 21, 1938

2 Claims. (Cl. 188—104)

This invention is for improvements in or relating to weighing mechanism of the kind which employs a pivoted weigh beam.

According to the invention there is provided in weighing mechanism having a pivoted weigh beam, a device for damping oscillations of a weigh beam comprising means to produce a magnetic field and a conductor loop arranged to make a turning movement in said field in response to the movement of the weigh beam. The term "conductor loop" is employed herein to distinguish a device constructed in accordance with the invention from a device having an armature other than a loop or coil and which, when moved in a magnetic field, produces only eddy currents.

The weigh beam may comprise the conductor loop (e. g., the weigh beam may comprise a rectangular frame). The means for producing the magnetic field may comprise an electromagnet or the means may comprise one or more permanent magnets (e. g., the magnet or each magnet may be formed from an alloy of the kind hereinafter set forth).

Two permanent magnets may be provided at opposite parts of the conductor loop remote from the turning axis, one of said magnets being at each of said parts.

Means may be provided to adjust the strength of the magnetic field for the purpose of obtaining the desired sensitivity of the weigh beam.

Some embodiments of the invention will be described by way of example with reference to the accompanying drawings which show the invention applied to weighing mechanism for weighing single cigarettes and in which—

Like reference numerals refer to like parts throughout the specification and drawings.

Figure 1:
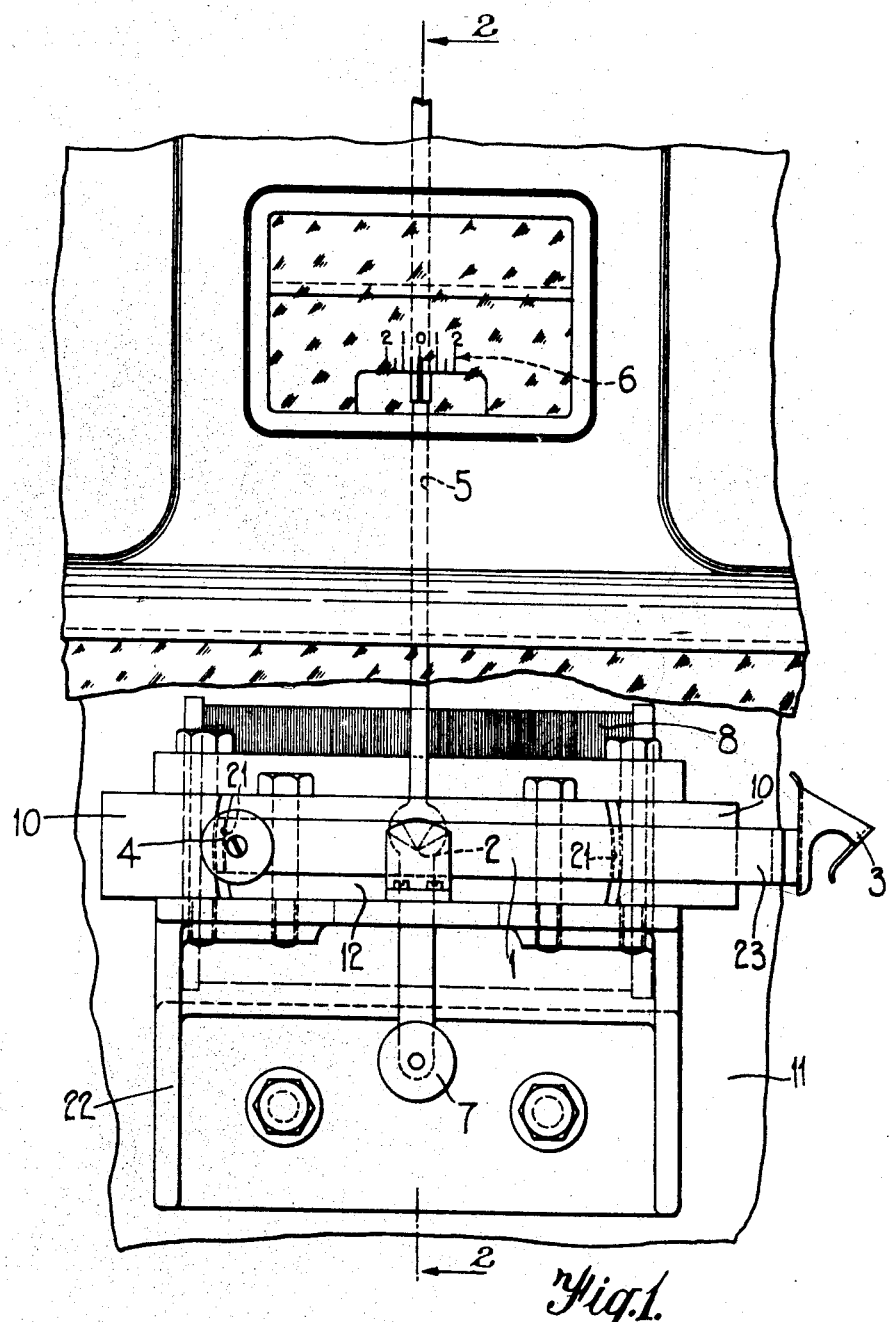
Figure 1 is a front elevation of a weighing mechanism having applied thereto a damping device constructed in accordance with the invention.

Each form of weighing mechanism shown in the drawings may have attached thereto mechanism for recording weighing operations effected by the weighing mechanism, but since such recording mechanism forms no part of the invention it is not shown in the accompanying drawings.

Figure 2:
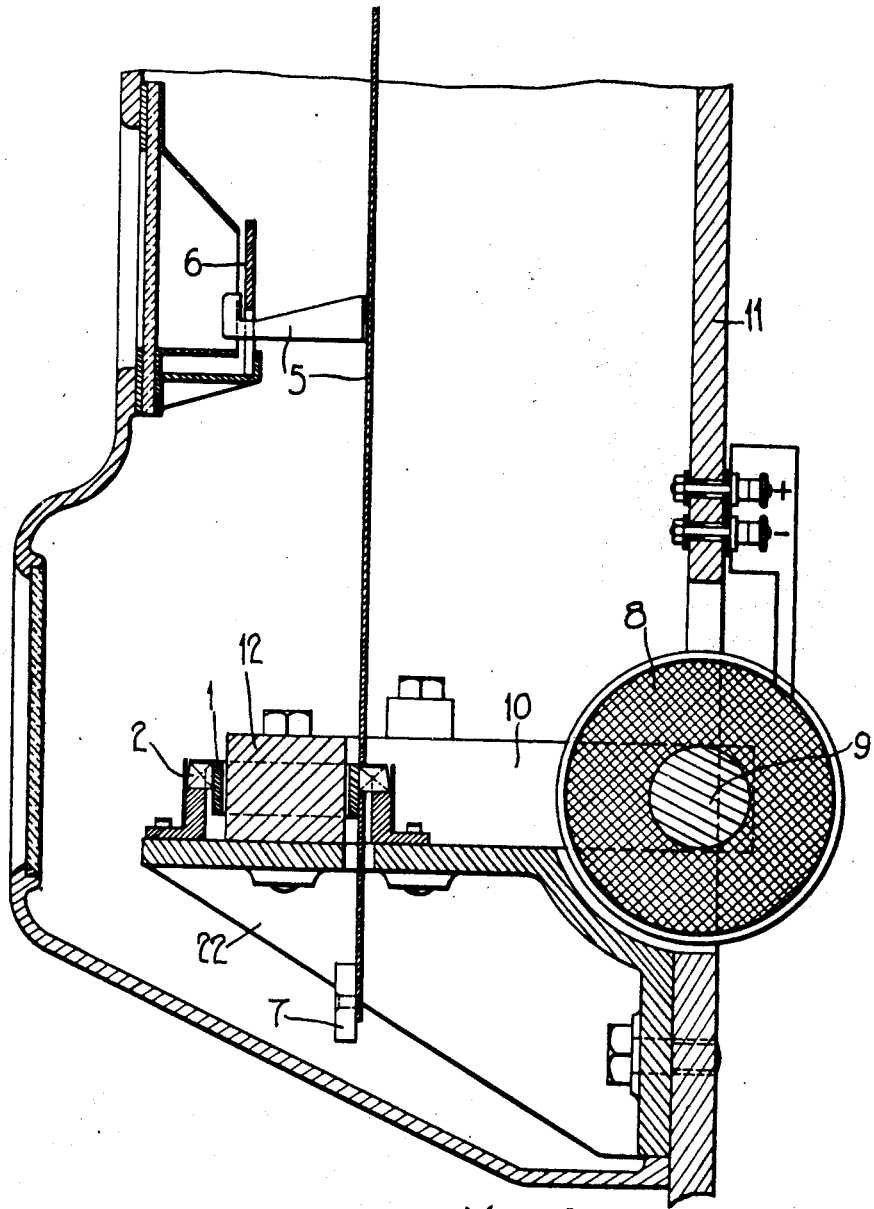
Figure 2 is a section of Figure 1 on the line 2—2.

Referring to Figures 1 and 2, the weigh beam 1 consists of a rectangular frame, made from aluminium or other non-magnetic material mounted on knife edge supports 2. A scale pan 3 supported by a projection 23 extending from the weigh beam is adapted to receive a single cigarette which is mechanically fed and removed from the scale pan after a weighing operation by mechanism not shown. The scale pan 3 containing a cigarette is balanced by a weight 4, and the parts are so adjusted that when a cigarette is balanced by the weight the weigh beam is horizontal. A pointer 5 is fixed to the weigh beam for movement therewith and moves over a scale 6. When the weigh beam is horizontal the pointer is vertical. The scale 6 is graduated on either side of a vertical line which is marked 0, and movements of the pointer to either side of the zero point show by how much a given cigarette is light or heavy in comparison with a cigarette of the desired weight. The pointer is balanced by a weight 7.

A magnet—i. e., a circuit comprising a coil 8 with a core 9 and pole pieces 10 is fixed to a bracket 22 mounted on the frame 11 of the apparatus, and the ends of the pole pieces are curved as shown in Figure 1 to a radius struck from the centre of suspension of the weigh beam. The cross members 21 of the weigh beam are similarly curved and thus the air gap is reduced to the minimum possible. The point of suspension is at the central axis of the rectangular frame of the weigh beam so that the cross members 21 move in the middle of the air gap and do not contact with the pole pieces. Between the cross members 21 of the beam there is a pole piece or stationary armature 12 made of wrought iron, steel or other suitable magnetic material and having its ends curved to correspond with the inner faces of the cross members 21 and the pole pieces 10. The pole piece 12 is fixed to the bracket 22 supported by the frame 11. The bracket 22 and frame 11 are both formed from non-magnetic material. The result of the arrangement is that the cross members move in a small air gap between the pole pieces 10 and 12 and the flux density in the gap is kept at the maximum possible in the circumstances.

The rectangular weigh beam thus constitutes a single short circuited conductor loop and the turning movements of the weigh beam in the magnetic field cause a current to be set up in the loop which current opposes the movement of the weigh beam and quickly brings it to rest.

Figure 3:
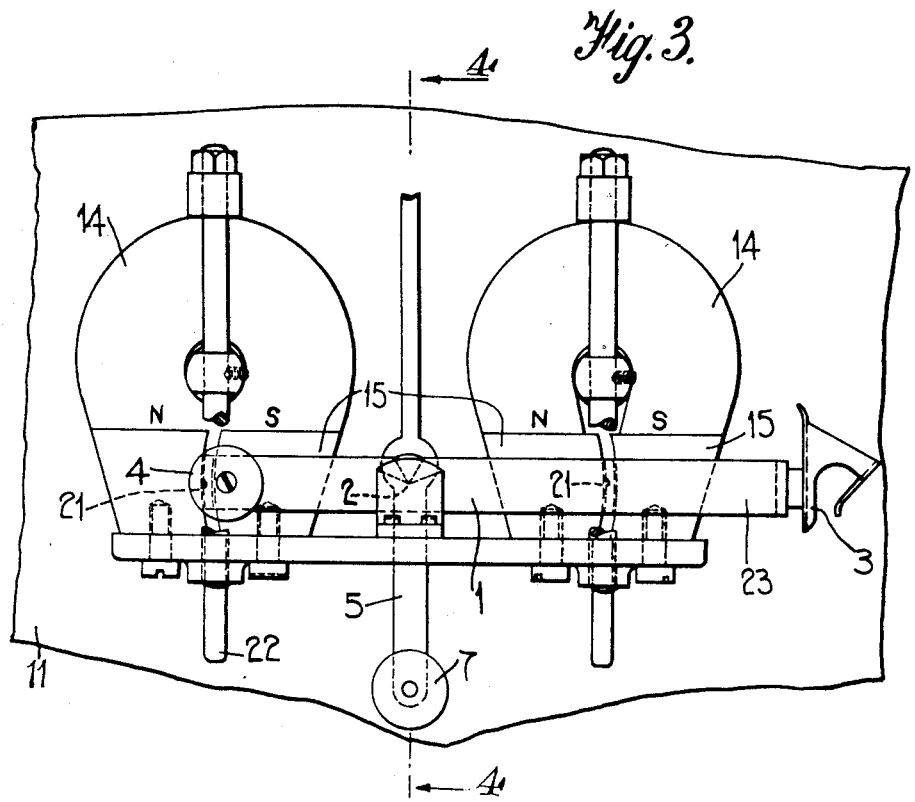
Figure 3 is a front elevation of a weighing apparatus having appled thereto an alternative form of damping device constructed in accordance with the invention.
Figure 4:
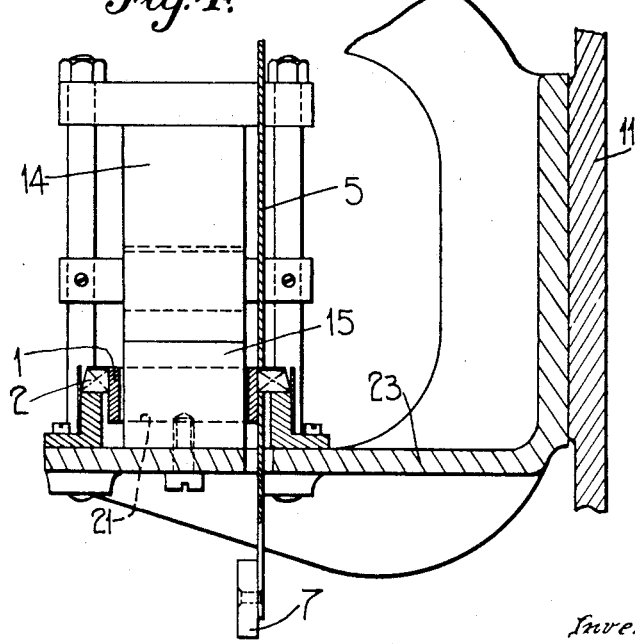
Figure 4 is a section of Figure 3 on the line 4—4.

In the alternative construction shown in Figures 3 and 4 two horse-shoe shaped permanent magnets 14 are employed, each provided with pole pieces 15. The magnets 14 are fixed with their poles as marked so that the currents induced in the conductor loop by each of the magnets are in the same direction. Preferably, the magnets 14 are movable relatively to the pole pieces 15 for a purpose described below.

As can be seen from Figure 3, the two magnets are so arranged as to be at opposite parts on the conductor loop which parts are remote from the turning axis of the loop. These parts comprise the cross members 21 which are parallel to the turning axis of the loop.

In the construction shown in Figures 3 and 4 the permanent magnets are made from a known aluminium-nickel-iron alloy, hereinafter referred to as "an alloy of the kind described," since such permanent magnets are found to retain their magnetic properties for a greater length of time than do other known permanent magnets.

When permanent magnets made from an alloy of the kind described are used an enormous flux is available and in such cases it is permissible to use a comparatively wide air-gap with straight sides, thus avoiding the necessity of working the pole pieces to the curvatures shown in the drawings. Moreover, the cross members 21 of the weigh beam may also be straight, i. e., of rectangular cross-section, and thus the manufacture of the whole apparatus is easier and cheaper.

In the drawings the permanent magnets are shown rigidly clamped in position. This is not strictly necessary with the magnets made from an alloy of the kind described as such magnets are very powerful, but if the magnets are not clamped it is desirable to provide locating abutments to prevent accidental displacement by a violet blow, e. g., in transit.

Although the invention has been described with reference to a particular kind of weighing mechanism, it will be appreciated that it can be applied to other kinds of weighing mechanism.

What I claim as my invention and desire to secure by Letters Patent is:

1. In weighing mechanism, means to produce a magnetic field and a weigh beam comprising a conductor loop, said beam being constituted by a rectangular frame pivoted to make a turning movement in said field and thereby to damp oscillations of the weigh beam.

2. In weighing mechanism two permanent magnets each to produce a magnetic field and a weigh beam comprising a conductor loop, the beam being constituted by a rectangular frame pivoted to make turning movements in said fields and thereby to damp oscillations of the weigh beam, said magnets being disposed one at each of those sides of the rectangular frame which are parallel to the turning axis of the frame.

GORDON FRANCIS WELLINGTON POWELL.